(12) United States Patent
Kupratis et al.

(10) Patent No.: US 10,787,996 B2
(45) Date of Patent: *Sep. 29, 2020

(54) GAS TURBINE ENGINE WITH STREAM DIVERTER

(71) Applicant: UNITED TECHNOLOGIES CORPORATION, Farmington, CT (US)

(72) Inventors: Daniel Bernard Kupratis, Wallingford, CT (US); Francis R. Moon, Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 742 days.

This patent is subject to a terminal disclaimer.

(21) Appl. No.: 15/383,900

(22) Filed: Dec. 19, 2016

(65) Prior Publication Data

US 2017/0089299 A1   Mar. 30, 2017

Related U.S. Application Data

(63) Continuation of application No. 13/937,670, filed on Jul. 9, 2013, now Pat. No. 9,523,329.

(Continued)

(51) Int. Cl.

| | |
|---|---|
| *F02K 3/075* | (2006.01) |
| *F02C 3/13* | (2006.01) |
| *F02C 9/18* | (2006.01) |
| *F02K 3/077* | (2006.01) |
| *F02C 3/14* | (2006.01) |

(Continued)

(52) U.S. Cl.
CPC .............. *F02K 3/075* (2013.01); *F02C 3/13* (2013.01); *F02C 3/145* (2013.01); *F02C 9/18* (2013.01); *F02K 1/80* (2013.01); *F02K 1/805* (2013.01); *F02K 3/077* (2013.01); *F02K 3/06* (2013.01);

(Continued)

(58) Field of Classification Search
CPC .... F02C 3/13; F02C 3/145; F02C 9/16; F02C 9/18; F02C 7/04; F02C 7/057; F02K 3/06; F02K 3/075; F02K 3/077; F02K 1/80; F02K 1/805; F05D 2210/40; F05D 2250/311

See application file for complete search history.

(56) References Cited

U.S. PATENT DOCUMENTS

| | | | |
|---|---|---|---|
| 2,504,181 A | 4/1950 | Constant | |
| 2,704,434 A * | 3/1955 | Schmitt | F02K 3/12 60/761 |

(Continued)

OTHER PUBLICATIONS

International Preliminary Report; International Application No. PCTUS2014041746; International Filing Date Jun. 10, 2014; dated Jan. 21, 2016.

(Continued)

*Primary Examiner* — Alain Chau
(74) *Attorney, Agent, or Firm* — Cantor Colburn LLP

(57) ABSTRACT

In accordance with one aspect of the disclosure, a stream diverter for a gas turbine engine is disclosed. The stream diverter may include a first air duct, a second air duct, a third air duct, and a door operatively associated with the second and third air ducts of the gas turbine engine. The door may have at least an open position allowing air from the second air duct to flow into the third air duct and a closed position preventing air from flowing between the ducts.

15 Claims, 3 Drawing Sheets

Related U.S. Application Data

(60) Provisional application No. 61/799,627, filed on Mar. 15, 2013.

(51) Int. Cl.
*F02K 1/80* (2006.01)
*F02K 3/06* (2006.01)

(52) U.S. Cl.
CPC .... *F05D 2210/40* (2013.01); *F05D 2250/311* (2013.01)

(56) References Cited

U.S. PATENT DOCUMENTS

| | | | | |
|---|---|---|---|---|
| 3,131,536 A * | 5/1964 | Snell | F02K 3/06 | 60/226.1 |
| 3,161,018 A * | 12/1964 | Sandre | F02K 7/16 | 60/262 |
| 3,589,132 A * | 6/1971 | Du Pont | F02K 3/105 | 60/262 |
| 3,879,941 A * | 4/1975 | Sargisson | B64D 33/02 | 60/226.3 |
| 4,010,608 A * | 3/1977 | Simmons | F02K 3/075 | 60/226.3 |
| 4,064,692 A | 12/1977 | Johnson et al. | | |
| 4,085,583 A * | 4/1978 | Klees | F02K 3/075 | 60/204 |
| 4,409,788 A * | 10/1983 | Nash | F02K 1/822 | 415/157 |
| 5,044,153 A | 9/1991 | Mouton | | |
| 5,279,109 A | 1/1994 | Liu et al. | | |
| 5,351,473 A | 10/1994 | Shuba | | |
| 5,402,638 A * | 4/1995 | Johnson | F02K 3/075 | 60/204 |
| 5,404,713 A * | 4/1995 | Johnson | F02K 1/825 | 60/204 |
| 5,845,482 A | 12/1998 | Carscallen | | |
| 5,867,980 A | 2/1999 | Bartos | | |
| 6,763,654 B2 * | 7/2004 | Orlando | F01D 1/24 | 60/226.1 |
| 6,901,739 B2 * | 6/2005 | Christopherson | F01D 17/105 | 60/226.3 |
| 7,134,271 B2 * | 11/2006 | Baughman | F01D 5/022 | 60/226.1 |
| 7,216,475 B2 | 5/2007 | Johnson | | |
| 7,237,378 B2 * | 7/2007 | Lardellier | F02K 1/48 | 60/226.1 |
| 7,784,266 B2 * | 8/2010 | Baughman | F01D 17/105 | 60/204 |
| 7,878,005 B2 * | 2/2011 | Bradbrook | F02K 3/075 | 60/788 |
| 8,082,727 B2 * | 12/2011 | Roberge | F02C 3/13 | 60/226.1 |
| 8,127,528 B2 * | 3/2012 | Roberge | F02C 3/10 | 60/224 |
| 8,356,483 B2 | 1/2013 | Petty et al. | | |
| 8,387,389 B2 * | 3/2013 | Avellan | F02C 3/13 | 60/262 |
| 8,516,789 B2 * | 8/2013 | Kupratis | F02C 3/145 | 60/226.1 |
| 8,935,912 B2 * | 1/2015 | Norris | F02K 3/105 | 60/226.1 |
| 9,243,563 B2 * | 1/2016 | Lo | F02C 7/12 | |
| 9,353,684 B2 * | 5/2016 | Rupp | F02C 7/04 | |
| 9,523,329 B2 * | 12/2016 | Kupratis | F02K 3/075 | |
| 2004/0060279 A1 * | 4/2004 | Robert Joseph | F01D 1/24 | 60/226.1 |
| 2005/0060983 A1 | 3/2005 | Lardellier | | |
| 2010/0162682 A1 * | 7/2010 | Lerg | F02C 7/052 | 60/226.1 |
| 2010/0180572 A1 * | 7/2010 | Wadia | F01D 5/022 | 60/226.1 |
| 2011/0023446 A1 * | 2/2011 | Avellan | F02C 3/13 | 60/39.23 |
| 2011/0056208 A1 * | 3/2011 | Norris | F02K 3/105 | 60/772 |
| 2011/0167784 A1 * | 7/2011 | Johnson | F01D 17/162 | 60/204 |
| 2011/0167791 A1 | 7/2011 | Johnson et al. | | |
| 2012/0272656 A1 * | 11/2012 | Norris | F02C 3/145 | 60/772 |
| 2013/0025286 A1 | 1/2013 | Kupratis | | |
| 2013/0145769 A1 * | 6/2013 | Norris | F02K 3/105 | 60/772 |
| 2013/0255224 A1 | 10/2013 | Kupratis et al. | | |
| 2013/0343867 A1 * | 12/2013 | Moon | F02K 3/025 | 415/1 |
| 2014/0260180 A1 | 9/2014 | Kupratis et al. | | |
| 2015/0322855 A1 * | 11/2015 | Kupratis | F01D 1/04 | 60/805 |
| 2015/0369134 A1 * | 12/2015 | Kupratis | F02C 3/04 | 60/208 |
| 2015/0377125 A1 * | 12/2015 | Kupratis | F02K 3/06 | 60/774 |

OTHER PUBLICATIONS

International Search Report and Written Opinion for International Application No. PCT/US2014/041746; International Filing Date: Jun. 10, 2014; dated Oct. 2, 2014; 15 pgs.

* cited by examiner

GAS TURBINE ENGINE WITH STREAM DIVERTER

CROSS REFERENCE TO RELATED APPLICATIONS

This application is a continuation of U.S. patent application Ser. No. 13/937,670 filed on Jul. 9, 2013, which claims the benefit of U.S. Provisional Application Ser. No. 61/799,627, filed on Mar. 15, 2013, the contents each of which are incorporated herein in their entirety by reference thereto.

STATEMENT OF GOVERNMENT INTEREST

The United States Government has certain rights in this invention pursuant to contract number FA8650-09-D-2923/DO13 between the United States Air Force and United Technologies Corporation.

FIELD OF THE DISCLOSURE

The present disclosure generally relates to gas turbine engines, and more specifically relates to fan nozzles for geared turbofan engines.

BACKGROUND OF THE DISCLOSURE

Gas turbine engines generally have a plurality of axially aligned components including a fan, a compressor section, a combustor, and a turbine section. The fan, positioned at a forward end of the engine, rotates to draw in and accelerate ambient air. Some of the accelerated air flows downstream to the compressor section, as a core flow, where the air is compressed and then flows downstream to the combustor. At the combustor, the compressed air is mixed with fuel and combusted to form an exhaust. The exhaust expands from the combustor through the turbine section, causing turbines of the turbine section to rotate, and then flowing out of the engine at an aft end of the engine. The rotation of the turbines drives the rotation of the fan and compressors by way of a shaft, or a plurality of concentrically mounted shafts in the case of a multi-spool engine. It can therefore be seen that once this process has begun it is self-sustaining.

A reverse core gas turbine engine works differently in that air is pressurized with the fan at the forward end of the engine and transported to the aft end of the engine to the compressor section. From the compressor section, the air flows in a forward direction through the combustor and turbine section. From the turbine section, the air is redirected in an aftward direction to generate thrust. Typically, reverse core engines include three air streams, the core stream described above, a bypass stream that is utilized for only generating thrust, and a middle stream that mixes with the exhaust from the core stream before flowing out of the engine. If the fan pressure ratio between these streams is low, a variable fan intake nozzle may be necessary to control an operating line of the fan, especially between takeoff and cruise.

While effective, the equipment necessary for the variable fan intake nozzle introduces weight and complexity to the fan nozzle. Therefore, a new manner of controlling the fan operating line that does not introduce additional weight and complexity into the fan nozzle is necessary.

SUMMARY OF THE DISCLOSURE

In accordance with one aspect of the disclosure, a stream diverter for a gas turbine engine is disclosed. The stream diverter may include a first air duct, a second air duct, a third air duct, and a door operatively associated with the second and third air ducts of the gas turbine engine. The door may have at least an open position allowing air from the second air duct to flow into the third air duct and a closed position preventing air from flowing between the ducts.

In a refinement, the stream diverter may further include an actuator operatively associated with the door such that the actuator may move the door between at least the open and closed positions.

In another refinement, the stream diverter may further include a plurality of doors. The doors may be arranged circumferentially around the gas turbine where each door overlaps an adjacent door.

In yet another refinement, the stream diverter may further include a hinge mounting the door to the ducts such that the door may swing between at least the open position and the closed position.

In still another refinement, the gas turbine engine may be a reverse core engine. One duct may be a middle duct of the reverse core engine and the other duct may be an outer duct of the reverse core engine.

In accordance with another aspect of the disclosure, a gas turbine engine is disclosed. The engine may include a first air duct communicating air through the gas turbine engine, a second air duct adjacent to the first air duct and communicating air through the gas turbine engine, and a third air duct adjacent to the second air duct and communicating air through the gas turbine engine. The engine may further include a stream diverter positioned between the second air duct and the third air duct. The stream diverter may include a door operatively associated with the ducts such that the door has an open position that allows air from the second air duct to flow into the third air duct and a closed position that prevents mixing of air from the second and third air ducts.

In a refinement, the gas turbine engine may further include a fan, where the stream diverter is positioned immediately downstream of the fan.

In a further refinement, the fan may be a secondary fan of the gas turbine engine.

In another refinement, the stream diverter may be position radially outward from the second air stream.

In yet another refinement, the stream diverter may further include an actuator operatively associated with the door such that the actuator moves the door between at least the open position and the closed position.

In still another refinement, the gas turbine engine may be a reverse core engine, where the second duct may be a middle duct and the third duct may be an outer duct.

In accordance with yet another aspect of the present disclosure, a method of operating a stream diverter in a gas turbine engine is disclosed. The method may include the steps of communicating air through the gas turbine engine with at least two ducts and diverting air from one duct to another duct with a stream diverter positioned between the two ducts by opening a door of the stream diverter.

In a refinement, the door of the stream diverter may be opened during a cruise mode of operation of the gas turbine engine.

In a further refinement, the door of the stream diverter may be fully opened during the cruise mode of operation.

In another refinement, the door of the stream diverter may be only partially opened.

In another refinement, the method may further include restricting the flow of air between the two ducts by closing the door of the stream diverter.

In a further refinement, the door of the stream diverter may be closed during a takeoff mode of operation of the gas turbine engine.

In yet another refinement, the door of the stream diverter may be opened to adjust an air pressure ratio in the two ducts.

In yet another refinement, the door of the stream diverter may be opened to centrifuge debris out of the second duct and into the third duct.

In still another refinement, the gas turbine engine may be a reverse core engine, where one duct may be a middle duct and the other duct may be an outer duct.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
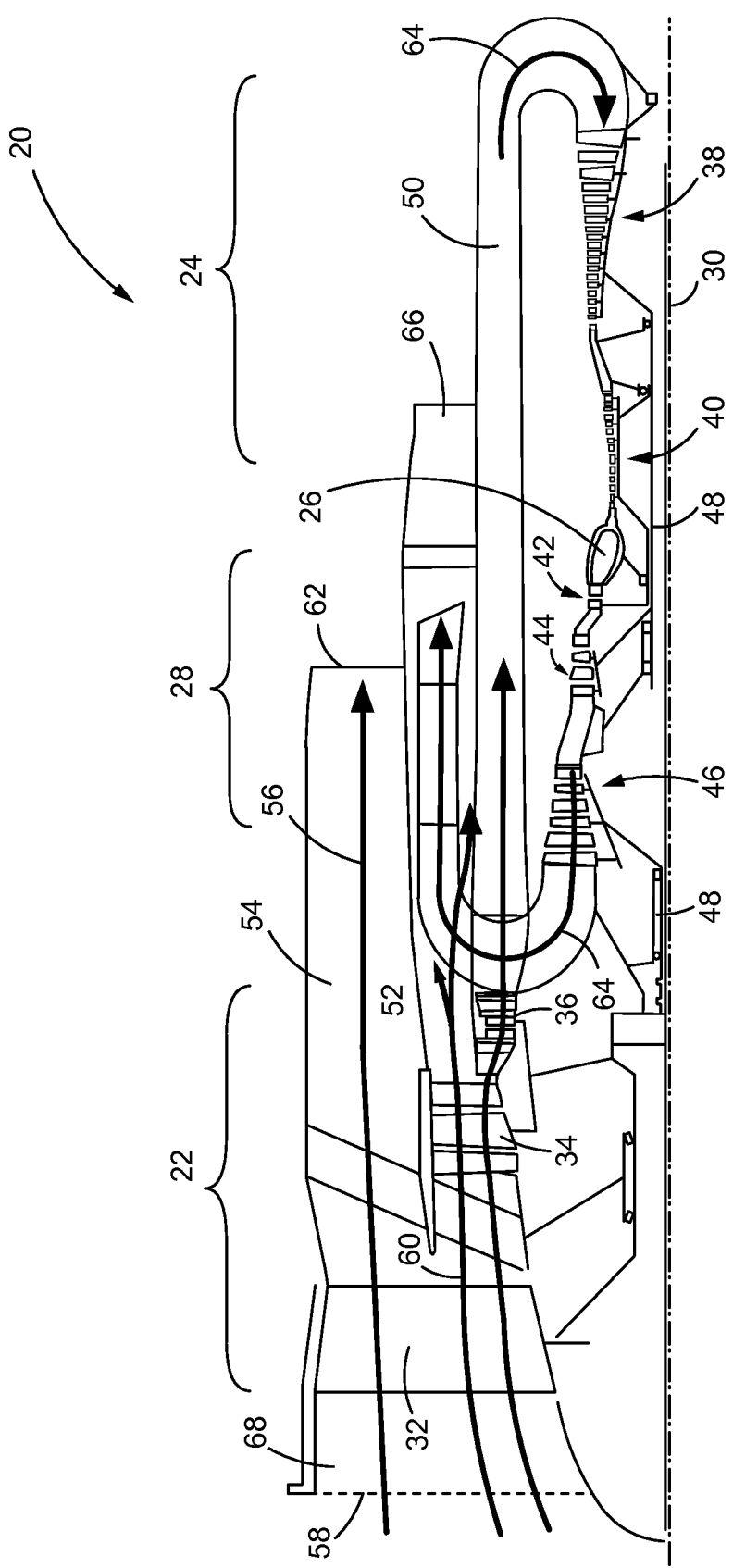
FIG. 1 is a schematic view of a gas turbine engine.

Referring now to the drawings, and with specific reference to FIG. 1, a gas turbine engine 20 is illustrated. Specifically, a reverse core geared turbofan engine is illustrated. However, any engine having multiple intake air streams is envisioned as benefiting from the material disclosed herein.

In downstream sequence, distributed along the engine central longitudinal axis 30, the engine 20 includes a fan section 22, a compressor section 24, a combustor 26, and a turbine section 28. The fan section 22 includes, in a downstream sequence, a first fan 32, a second fan 34, and a third fan 36. The compressor section 24 includes, in a downstream sequence, a low pressure compressor 38 and a high pressure compressor 40. The turbine section 28 includes, in a downstream sequence, a high pressure turbine 42, an intermediate turbine 44, and a low pressure turbine 46. The turbines 42, 44, 46 mechanically drive the compressors 40, 38 and the fan section 22, respectively, via a plurality of engine shafts 48.

As can be seen in FIG. 1 a first duct 50, a second duct 52, a third duct 54, and a fan nozzle 68 communicate air through the engine 20. The fan nozzle 68, positioned at a forward end of the engine 20, accepts air from the atmosphere through a fan nozzle inlet 58 and communicates the air across the first fan 32. The third duct 54, illustrated as a radial outer duct, communicates a bypass stream 56 from the fan nozzle 68 to a bypass air outlet 62. The second duct 52, illustrated as a radial middle duct, receives air from the fan nozzle 68 and communicates that air as a middle stream 60 across the second fan 34 and to a core air outlet 66. The first duct 50, illustrated as a radial inner duct, receives air from the second duct 52 and communicates that air as a core stream 64 across the third fan 36. Thereafter, the air is communicated through the compressor section 24, to the combustor 26, through the turbine section 28, and back into the second duct 52. The air is then mixed with the middle stream 60 and discharged through the core air outlet 66.

Figure 2:
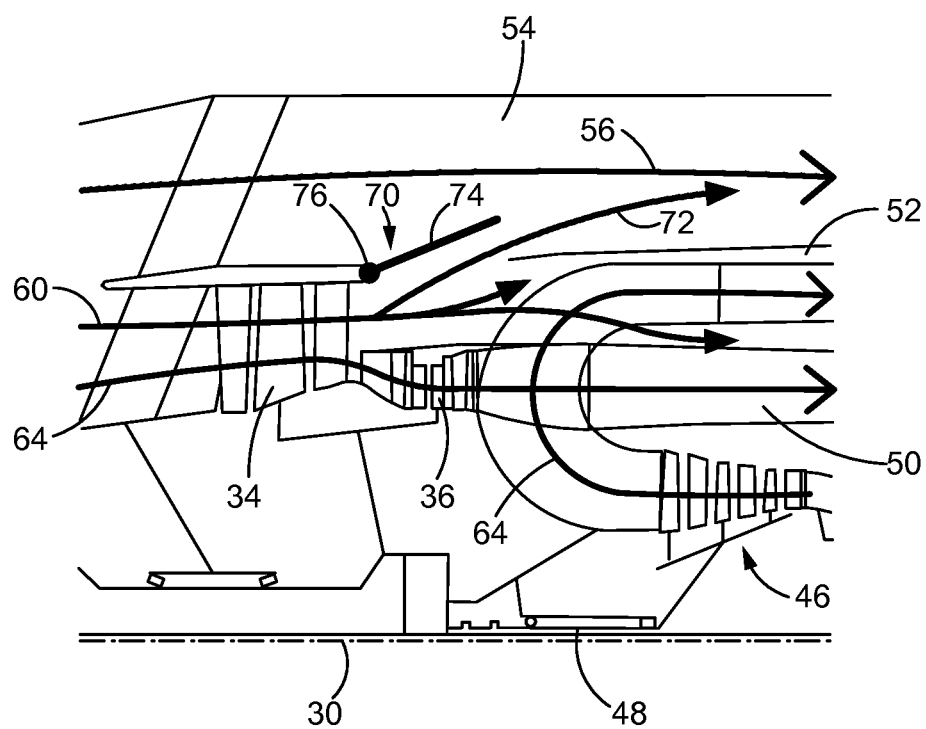
FIG. 2 is a schematic view of a gas turbine engine constructed in accordance with an embodiment of the present disclosure and detailing a stream diverter having a hinged door in an open position.
Figure 3:
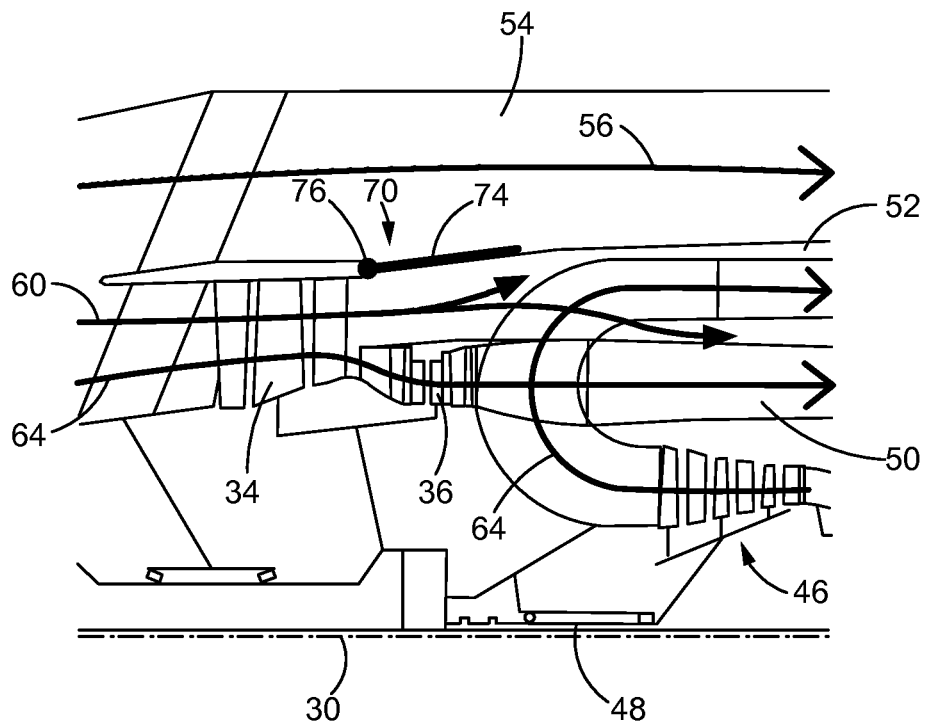
FIG. 3 is a schematic view of a gas turbine engine constructed in accordance with an embodiment of the present disclosure and detailing a stream diverter having a hinged door in a closed position.

The engine 20 includes a stream diverter 70 positioned downstream of the second fan 34, between the second duct 52 and third duct 54, as illustrated in FIGS. 2 and 3. The stream diverter 70 includes a door 74 or other partition that has at least an open position and a closed position. The door 74 is operatively associated with the ducts 52, 54 such that the open position allows a diverted air stream 72 to flow from one duct into the other duct, illustrated from the second duct 52 to the third duct 54. The closed position of the door 74 prevents any mixing of air between the second and third ducts 52, 54. The stream diverter 70 may include a single door 74 or a plurality of doors 74 distributed circumferentially about the engine between the ducts 52 and 54. Each of the doors 74 may overlap an adjacent door such that at the open position and the closed position no air passes between the doors 74.

Figure 4:
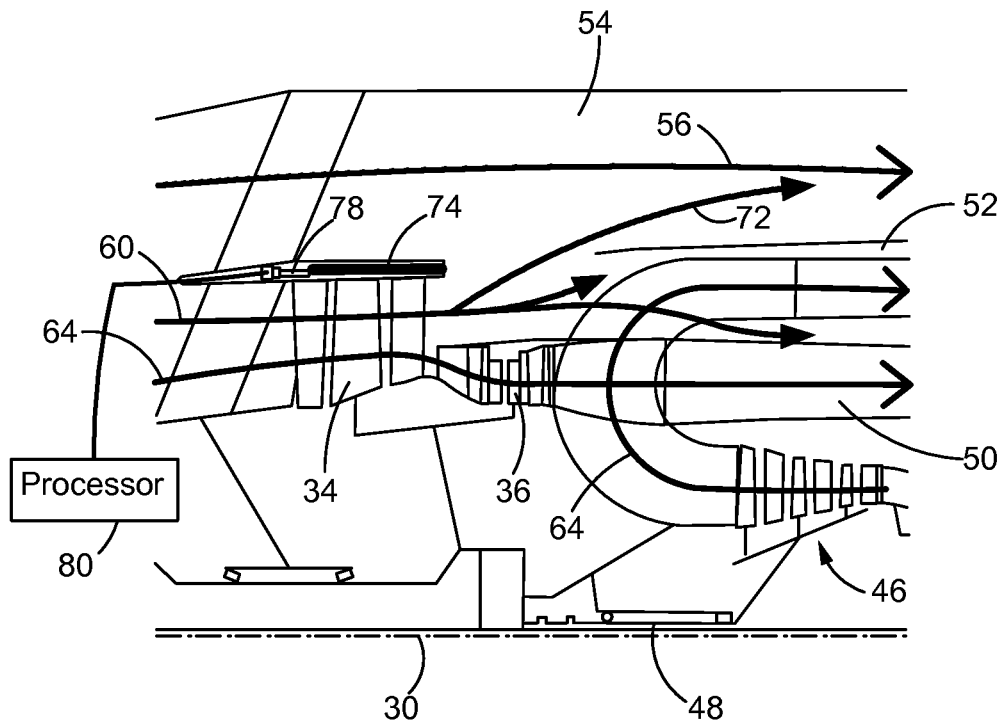
FIG. 4 is a schematic view of a gas turbine engine constructed in accordance with an embodiment of the present disclosure and detailing a stream diverter having a sliding door in an open position.
Figure 5:
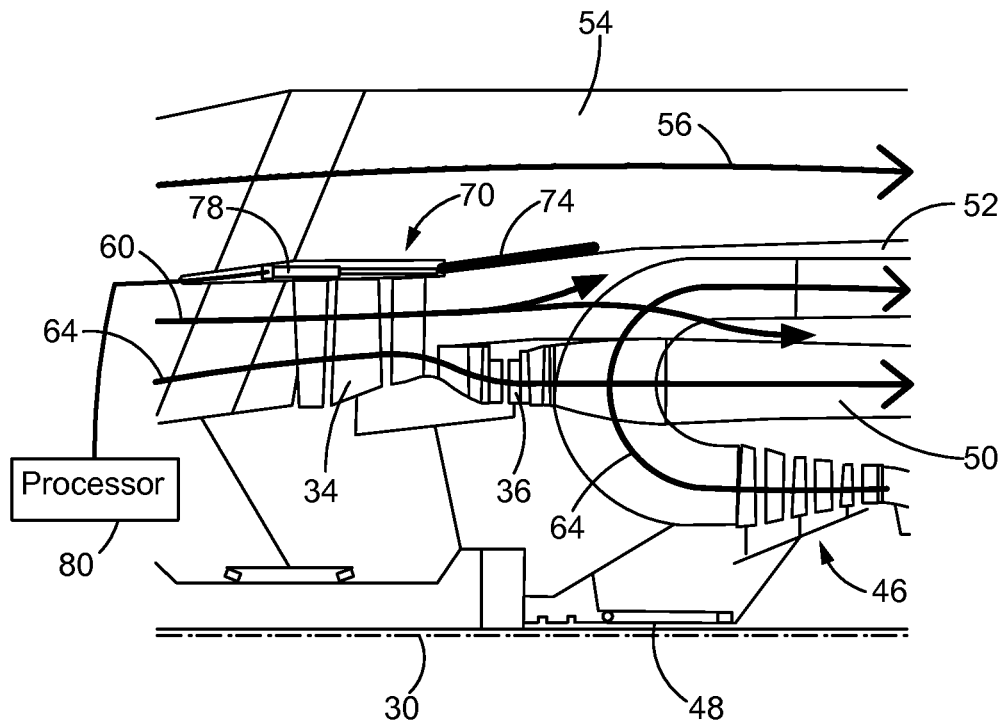
FIG. 5 is a schematic view of a gas turbine engine constructed in accordance with an embodiment of the present disclosure and detailing a stream diverter having a sliding door in a closed position.

As also illustrated in FIGS. 2 and 3, the door 74 is operatively associated with a hinge 76 to allow the door 74 to pivot between at least the open position and the closed position. However, the door 74 moves between an open position and a closed position via other means as well, such as, but not limited to, a roller or a track to allow the door 74 to slide between open and closed positions such as depicted in FIGS. 4 and 5.

While the door 74 has been described as having an open position and a closed position, other positions are also possible. In one example, the door 74 has multiple open positions such that different quantities of air are allowed to flow from the second duct 52 to the third duct 54 at each position. Alternatively, the door 74 is capable of being disposed in a position or positions that allow air to flow from the third duct 54 into the second duct 52.

The door 74 is operatively associated with an actuator 78 that moves the door 74 among the various positions available to the door 74. The actuator 78 is a hydraulic system, as illustrated in FIGS. 4 and 5, or the like, and is controlled by an operator or a processor 80 based on predetermined operating conditions, or as needed. The actuator 78 moves the door 74 to predetermined positions between, and including, a fully open position, that is, a position that allows a relative maximum flow of air between the two ducts 52, 54; and a fully closed position, that is, a position that prevents air from flowing between the ducts 52, 54. Alternatively, the actuator 78 moves the door 74 freely between, and including, the fully open and fully closed positions to a position specified by the operator or processor 80 during operation of the engine 20.

In operation, the operator or processor 80 determines when to open or close the door 74 of the stream diverter 70.

For instance, the door 74 is opened to allow any debris that may have entered into the second duct 52 to centrifuge out of the second duct 52 and into the third duct 54. Other situations for opening and closing the door 74 is for, but not be limited to, modulating air pressure ratios between the second and third ducts 52, 54 and controlling a fan operating line. Alternatively, the door 74 is opened during specific operating conditions, such as a cruise mode and a takeoff mode of operation, or as needed to adjust pressure ratios or the fan operating line.

For example, the door 74 is fully opened during the cruise mode of operation as in FIGS. 2 and 4, which sets the operating line during the cruise mode on a fan map of the first fan 32. The fan map of the first fan 32 being a plot of an air pressure ratio in the third duct 54 to air throughput in the third duct 54. Where the air pressure ratio is a ratio of an air pressure of incoming air versus outgoing air. Opening the door 74 maximizes the flow of air through the third duct 54, increases the outgoing air pressure, but does not alter the incoming air pressure and thus sets the operating line left of a typical operating line. In these illustrated examples, the middle stream 60 is pressurized by the fans 32, 34 to a greater pressure than the bypass stream 56, so the diverted air stream 72 flows from the second duct 52 through the stream diverter 70 and into the third duct 54. To accommodate this flow of air, the third duct 54 is sized to pass the sum of the bypass stream 56 and the diverted air stream 72 when the door 74 is fully open. This sets the operating line of the first fan 32 during a cruise mode of operation of the engine 20. This open position of the door 74 reduces air pressure in the second duct 52 and increases air pressure in the third duct 54, both relative to the closed position, by allowing the air in the second duct 52 to flow into the third duct 54.

In a further example, the door 74 is closed during the takeoff mode of operation to increase the air pressure, relative the open position discussed above, in the second duct 52 by prohibiting the flow of air from the second duct 52 to the third duct 54. This causes the first fan 32 to upflow and shifts the operating line of the first fan 32 to the right. While only the fully open and fully closed positions of the door 74 have been described, any other position between 0% and 100% open are also possible.

INDUSTRIAL APPLICABILITY

From the foregoing, it can be seen that the technology disclosed herein has industrial applicability in a variety of settings such as, but not limited to providing variable fan nozzle functions for a gas turbine engine with a fixed fan nozzle. The stream diverter may be shifted between set positions or moved freely by an operator or a processor to modulate the pressure ratio of the air streams of the engine and the operating line of the fan.

While various embodiments are positively recited herein, no single embodiment is intended on limiting the scope of any other embodiment or the scope of the invention. Moreover, while the present disclosure has been made in reference to a gas turbine engine and an aircraft, and specifically to diverting air streams in a reverse core geared turbofan engine, one skilled in the art will understand that the teachings herein can be used in other applications as well such as, but not limited to, providing variable nozzle functions to gas turbine engines that have three intake air streams with a fixed fan nozzle. It is therefore intended that the scope of the invention not be limited by the embodiments presented herein as the best mode for carrying out the invention, but that the invention include all equivalents falling within the spirit and scope of the appended claims as well.

What is claimed is:

1. A stream diverter system for a reverse-core gas turbine engine, downstream of a fan inlet nozzle and a first fan, the stream divider system comprising:
    a first air duct fluidly receiving core air through a core fan;
    a second air duct, radially exterior to the first air duct, fluidly receiving air from the fan inlet nozzle and fluidly communicating received air as a middle stream across a second fan to a core air outlet;
    the second fan being downstream of the first fan, and the core fan being downstream of the second fan;
    a third air duct, radially exterior to the second air duct, communicating a bypass stream from the fan inlet nozzle, toward a bypass air outlet; and
    wherein the stream diverter system includes
    a plurality of doors, downstream of the second fan and aligned along an engine central longitudinal axis with the core fan, separating the second air duct and the third air duct of the gas turbine engine,
    the plurality of doors having a hinge at an upstream end thereof and being operated between
    an open position, pivoted radially outwardly about the hinge, where a downstream end of the plurality of doors pivots into the third air duct to define a downstream facing opening, the opening allowing air from the second air duct to flow into the third air duct, and
    a closed position preventing air from flowing between the second air duct and the third air duct.

2. The system of claim 1, wherein each of the plurality of doors overlaps a circumferentially adjacent door so at the open position and closed position no air passes between the doors.

3. The system of claim 2, wherein the plurality of doors pivot to a plurality of open positions so different quantities of air flow from the second duct to the third duct at each position.

4. The system of claim 3, wherein an electronically controllable hydraulic actuator pivots the plurality of doors.

5. The system of claim 4, wherein the actuator is controlled based on flight conditions and/or flight phase.

6. A reverse-core gas turbine engine, comprising:
    a fan inlet nozzle and a first fan thereat,
    a stream diverter system, downstream of the fan inlet nozzle and the first fan, the stream divider system comprising:
    a first air duct fluidly receiving core air through a core fan;
    a second air duct, radially exterior to the first air duct, fluidly receiving air from the fan inlet nozzle and fluidly communicating received air as a middle stream across a second fan to a core air outlet;
    the second fan being downstream of the first fan, and the core fan being downstream of the second fan;
    a third air duct, radially exterior to the second air duct, communicating a bypass stream from the fan inlet nozzle, toward a bypass air outlet; and
    wherein the stream diverter system includes
    a plurality of doors, downstream of the second fan and aligned along an engine central longitudinal axis with the core fan, separating the second air duct and the third air duct of the gas turbine engine,
    the plurality of doors having a hinge at an upstream end thereof and being operated between
    an open position, pivoted radially outwardly about the hinge, where a downstream end of the plurality of doors pivots into the third air duct to define a downstream facing opening, the opening allowing air from the second air duct to flow into the third air duct, and a closed position preventing air from flowing between the second air duct and the third air duct.

7. The engine of claim 6, where each of the plurality of doors overlaps a circumferentially adjacent door so at the open position and closed position no air passes between the doors.

8. The engine of claim 7, wherein the plurality of doors pivot to a plurality of open positions so different quantities of air flow from the second duct to the third duct at each position.

9. The engine of claim 8, wherein an electronically controllable hydraulic actuator pivots the plurality of doors.

10. The engine of claim 9, wherein the actuator is controlled based on flight conditions and/or flight phase.

11. A method of operating a stream diverter system for a reverse-core gas turbine engine, downstream of a fan inlet nozzle and a first fan, the method comprising:

fluidly communicating core air through a core fan into a first air duct;

fluidly receiving air from the fan inlet nozzle and fluidly communicating the received air as a middle stream across a second fan to a second air duct, radially exterior to the first air duct, toward a core air outlet;

the second fan being downstream of the first fan, and the core fan being downstream of the second fan;

fluidly communicating a bypass stream from the fan inlet nozzle into a third air duct, radially exterior to the second air duct, toward a bypass air outlet; and wherein the method includes operating a plurality of doors, disposed downstream of the second fan and aligned along an engine central longitudinal axis with the core fan, separating the second air duct and the third air duct of the gas turbine engine, the plurality of doors having a hinge at an upstream end thereof and being operated between an open position, pivoted radially outwardly about the hinge, where a downstream end of the plurality of doors pivots into the third air duct to define a downstream facing opening, the opening allowing air from the second air duct to flow into the third air duct and a closed position preventing air from flowing between the second air duct and the third air duct.

12. The method of claim 11, wherein each of the plurality of doors overlaps a circumferentially adjacent door so at the open position and closed position no air passes between the doors.

13. The method of claim 12, wherein the plurality of doors pivot to a plurality of open positions so different quantities of air flow from the second duct to the third duct at each position.

14. The method of claim 13, wherein an electronically controllable hydraulic actuator pivots the plurality of doors.

15. The method of claim 14, wherein the actuator is controlled based on flight conditions and/or flight phase.

* * * * *